Dec. 5, 1961  A. FRIEDRICH ET AL  3,011,353
POWER TRANSMISSION FOR MOTOR VEHICLES
Filed March 18, 1959

INVENTORS:
ALBERT FRIEDRICH.
ANTON LENTZ.
BENNO KIRCHGÄSSNER.
BY
K.A.Mayr
ATTORNEY

United States Patent Office 3,011,353
Patented Dec. 5, 1961

3,011,353
POWER TRANSMISSION FOR MOTOR VEHICLES
Albert Friedrich and Anton Lentz, Heidelberg, and Benno Kirchgässner, Mannheim, Germany, assignors to Heinrich Lanz A.G., Mannheim, Germany, a corporation of Germany
Filed Mar. 18, 1959, Ser. No. 800,243
Claims priority, application Germany Mar. 19, 1958
5 Claims. (Cl. 74—15.8)

The present invention relates to power transmissions for motor vehicles, more particularly to a transmission including a continuous speed changer having a secondary shaft connectable by means of a clutch to a change speed gear which can be by-passed by a power take-off shaft drive whereby at least one power take-off shaft may be directly driven by the engine or by the vehicle drive by manipulation of suitable clutch means.

A transmission of the general type with which the invention is concerned is known wherein the clutch for driving a power take-off shaft by the engine independently of the vehicle is arranged, with respect to the flow of power, in front of the continuous speed changer as well as in front of the change speed gear. In this arrangement shifting of the change speed gear is impaired by the relatively great inertia of the continuous speed changer whether the main drive clutch or the clutch for driving a power take-off shaft is used. In this conventional transmission an additional drive shaft is provided which is an extension of the engine shaft and which is interposed between the primary and the secondary shafts of the continuous speed changer. The power take-off shaft driven by the engine and the drive by-passing the change speed gear receive their drive from the aforesaid additional shaft. The additional shaft is arranged coaxially of the main shaft of the change speed gear and is in the same plane as the primary and secondary shafts of the continuous speed changer. This additional shaft is cumbersome and makes the transmission bulky since three shafts are in the same plane.

In another conventional transmission the primary shaft of the continuous speed changer and the main transmission shaft of the change speed gear are arranged coaxially of the engine shaft, the power flowing in the change speed gear from the secondary shaft of the continuous speed changer through a connecting gearing to the main drive shaft. This conventional transmission has no power take-off drive.

The object of the present invention is to provide a power transmission of the type set forth above having an improved clutch and power take-off shaft arrangement.

In the transmisison according to the invention the clutch for controlling the drive of at least one power take-off shaft which is independent of the vehicle drive is arranged between the secondary shaft of the continuous speed changer and the change speed gear and the drive of another power take-off shaft is directly derived from the primary shaft of the continuous speed changer. In this way shifting of the change speed gear is facilitated because the moment of inertia of the continuous speed changer is separated from the change speed gear upon disengagement of the clutch. The clutch for connecting the drive of the power take-off shaft which drive depends on the engine and is independent of the vehicle, is placed within the casing of the change speed gear so that the size of the transmission is reduced. By directly connecting the power take-off shaft or the by-pass gearing to the primary shaft, one shaft is saved so that the transmission is simplified and the space needed for the by-pass gear is reduced.

The transmission according to the invention includes the conventional arrangement of two coaxial power take-off shafts which can be driven individually or jointly whereby the forward shaft is driven directly by the engine and the rear shaft is driven by the engine through the change speed gear. In the new transmission, however, also the forward power take-off shaft can be driven through the change speed gear and the adjoining ends of the power take-off shafts can be connected. The engine drive of the power take-off shafts may be effected by a double gear which is rotatable on one of the power take-off shafts and which has a gear engaging a gear mounted on the primary shaft of the continuous speed changer, the second gear of the double gear being in driving connection through a connecting gearing with a gear which is rotatable on the second power take-off shaft whereby the double gear and the single gear on the second power take-off shaft can be made fast on the respective shafts by means of clutch rings. Both power take-off shafts may be driven by the change speed gear by means of a gear which is fast on the main transmission shaft and which engages a gear which is rotatable on the rear or second power take-off shaft and may be made fast thereon by a clutch ring, the forward power take-off shaft being connected to the rear power take-off shaft by a clutch ring.

When the forward power take-off shaft and the by-pass transmission are in operation, the clutch between the secondary shaft of the continuous transmission and the change speed gear is disengaged so that the continuous speed changer as well as the change speed gear are by-passed. In this case the main transmission shaft can be driven at one of two speeds through the forward power take-off shaft, the connecting gearing and the rear power take-off shaft or at the other of the two speeds through the two connected power take-off shafts.

The novel features which are considered characteristic of the invention are set forth with particularity in the appended claims. The invention itself, however, and additional objects and advantages thereof will best be understood from the following description of an embodiment thereof when read in connection with the accompanying drawing, in which:

Like parts are designated by like numerals in both figures of the drawing.

Figure 1:
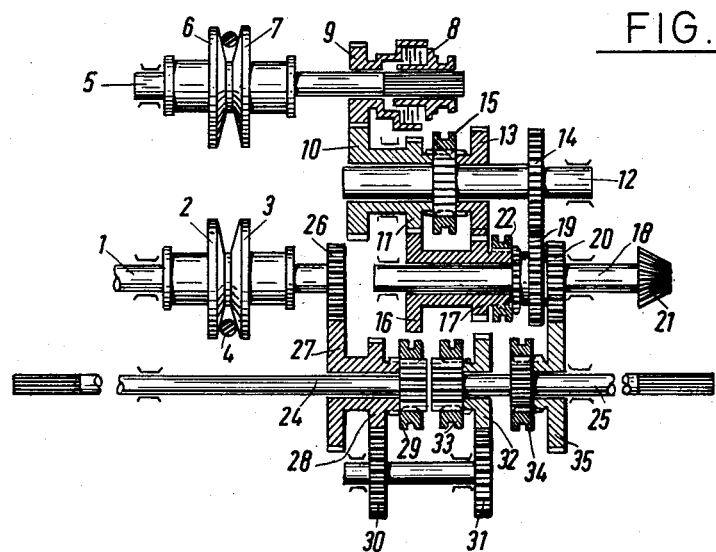
FIG. 1 is a part sectional schematic illustration of a transmission according to the invention suitable for an agricultural tractor, all shafts being shown in one plane.

Referring more particularly to the drawing, numeral 1 designates the drive shaft of the transmission which is connectable by a clutch to the engine shaft in the conventional manner, not shown. The shaft 1 is the primary shaft of a continuous speed changer of the vari-pitch sheave type including two discs 2 and 3 engaging a belt 4 driving a pair of discs 6 and 7 on a secondary shaft 5. The latter carries a gear 9 which is rotatable on the shaft 5 and which can be made fast thereon by a friction clutch 8. The teeth of the gear 9 mesh with the teeth of gear 10 of a double gear 10, 11 which is rotatable on a shaft 12 of a connecting gearing. The shaft 12 loosely supports a gear 13 and rigidly supports a gear 14. A sleeve or clutch ring 15 which is axially movable but not rotatable on the shaft 12 is interposed between the double gear 10, 11 and the loose gear 13 for selectively rigidly connecting the double gear 10, 11 or the gear 13 to the shaft 12. The gear 11 of the double gear 10, 11 is in engagement with a gear 16 of a second double gear 16, 17 which is rotatable on the main transmission shaft 18. Gears 19 and 20 and a drive pinion 21 are mounted on the shaft 18, the latter transmitting the engine drive to a gear, not shown. The double gear 16, 17 may be rigidly connected to the shaft 18 by means of a clutch ring 22.

The gears 9, 10, 11, 13, 14, 16, 17, 19, 20, 21, the shafts 5, 12, 18, and the clutch rings 15 and 22 are parts of a change speed gear arranged after the continuous speed changer 1 to 7 with respect to the direction of the power flow. The greatest speed reduction possible with the change speed gear corresponds to the creeping speed of the vehicle, i.e. about 0.8 km./h., when the transmission 1 to 7 is set for greatest speed reduction. By changing the transmission ratio of the speed changer 1 to 7 the speed of the vehicle can be continuously changed between about 0.8 km./h. and 3.2 km./h. The change speed gear is thereby set as follows: The gear 9 is connected to the secondary shaft 5 by engaging the clutch 8 and drives the double gear 10, 11 whose gear 11 rotates the double gear 16, 17 which is loose on the shaft 18. The gear 17 drives the gear 13 and, through the clutch ring 15, the shaft 12. The latter drives the main shaft 18 through the gears 14 and 19.

If the change speed gear is shifted to the second transmission ratio, power is transmitted through the gears 9, 10, 11 and 16 to the main shaft 18 whereby the clutch ring 15 is in the neutral position and the ring 22 connects the double gear 16, 17 to the shaft 18. In this position of the change gear any vehicle speed between 2.5 km./h. and 10 km./h. can be obtained by suitably setting the speed changer 1 to 7. These speeds are suitable for agricultural work.

The third gear ratio of the change speed gear is for operating the vehicle on the road at speeds between about 5 km./h. to 20 km./h., depending on the setting of the transmission 1 to 7. In this case power flows through the gears 9 and 10 to the shaft 12 which is connected to the double gear 10, 11 by the clutch ring 15. The main shaft 18 is driven by the shaft 12 through gears 14 and 19, the clutch ring 22 being in neutral position.

The transmission comprises two power take-off shafts 24 and 25 which may be individually or jointly driven either dependently on or independently of the driving speed. For this purpose a gear 26 is connected to the primary shaft 1 of the continuous speed changer, the gear 26 engaging a gear 27 of a double gear 27, 28 which is loose on the power take-off shaft 24. The double gear 27, 28 is connectable by means of a clutch ring 29 to the power take-off shaft 24 for driving the latter, the ring 29 being axially movable but not rotatable on the shaft 24. The second gear 28 of the double gear 27, 28 engages a gear 30 of a connecting gearing 30, 31 for driving a gear 32 which is loose on the second power take-off shaft 25. The gear 32 can be rigidly connected to the shaft 25 by means of a clutch ring 33 which is axially movable but not rotatable on the shaft 25. The power take-off shafts 24 or 25 can be driven individually independently of the gear ratio effected by the change speed gear. If the double gear 27, 28 is made fast on the shaft 24 by the ring 29 the shaft 24 will be rotated, for example, at 1000 r.p.m. The power take-off shaft 25 may not be driven at this time or may be connected to the shaft 24 by the clutch ring 33 and rotate also at a speed of 1000 r.p.m. The ring 33 may be so shifted that the gear 32 is made fast on the shaft 25 and the latter is driven through the connecting gearing 30, 31 which effects a speed reduction so that the shaft 25 is driven at a speed of 540 r.p.m. The shaft 24 may continue to rotate at 1000 r.p.m. if the clutch ring 29 is so shifted that the double gear 27, 28 is fast on the shaft 24. If the sleeve or clutch ring 29 is pulled out of the double gear 27, 28 and connects the shafts 25 and 24, the latter can also be rotated at a speed of 540 r.p.m. In this case the power is transmitted through the gears 27, 28, 30, 31 and 32 to the shaft 25 and from the latter to the shaft 24.

Each of the power take-off shafts 24 and 25 can be driven in dependence on the change speed gear. For this purpose a gear 35 is rotatable on the shaft 25 and can be made fast thereto by a clutch ring 34. The gear 35 is engaged by a gear 20 which is fast on the main shaft 18. When the sleeve or clutch ring 33 is in neutral position and the sleeve or clutch ring 34 is engaged, the shaft 25 is driven according to the speed of the shaft 18. The gear ratio provided by the gears 20 and 35 may be so that the speed of the shaft 25, when driven by the main shaft 18, is smaller, than when driven by the shaft 1. If the sleeve or clutch 33 is shifted to connect the shaft 24 to the shaft 25 the former can also be driven in dependence on the speed of the shaft 18.

If desired, the drive of the main shaft 18 may be derived from the primary shaft 1 of the transmission 1 to 7 via the drive of the power take-off shafts. In this case two gear ratios are available and the vehicle can be driven at two speeds. One gear ratio is effected by transmitting the power through the gears 26, 27, 28, 30, 31, 32, 35 and 20 to the main shaft 18 whereby the clutch rings 33 and 34 are shifted to connect the gears 32 and 35 to the shaft 25. The second gear ratio is effected by transmitting the power through the gear 26, the double gear 27, 28 and the clutch ring 29 to the power take-off shaft 24 and from the latter directly to the shaft 25 which is connected to the shaft 24 by the clutch ring 33. The shaft 18 is driven by the shaft 25 through the gears 35 and 20.

Figure 2:
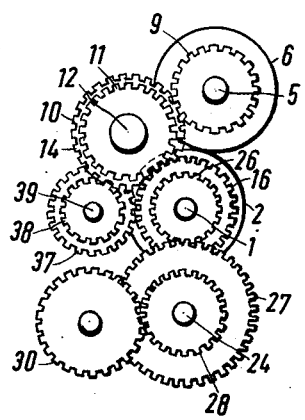
FIG. 2 is a diagrammatic end view of the transmission showing the shafts in their actual position.

For reverse drive, two gears 37 and 38 are provided, as shown in FIG. 2, which are rotatable on a shaft 39 and which are continuously in engagement with the gears 14 and 16. By actuating a clutch ring, not shown, the gears 37 and 38 can be rigidly connected for effecting reverse drive.

The invention is not limited to the described and illustrated example, many other embodiments being possible.

What is claimed is:

1. A power transmission for motor vehicles comprising a continuous speed changer having a primary shaft and a secondary shaft, a change speed gear, a main clutch interposed between said secondary shaft and said change speed gear, a power take-off shaft, means for disconnectably, operatively connecting said power take-off shaft and said change speed gear, and disconnectable drive means disconnectably connecting said primary shaft and said power take-off shaft.

2. A power transmission according to claim 1 wherein said change speed gear includes a main shaft and said means for disconnectably, operatively connecting said power take-off shaft and said change speed gear includes a gear fast on said main shaft, a gear rotatable on said power take-off shaft and in engagement with said gear on said main shaft, and clutch means interposed between said power take-off shaft and the gear rotatable on said power take-off shaft.

3. A power transmission as defined in claim 1 including an additional power take-off shaft placed coaxially of the first power take-off shaft, said power take-off shafts having adjacent ends, and clutch means operatively connected to said adjacent ends of said power take-off shafts, for driving said power take-off shafts either individually or jointly by said primary shaft independently of said change speed gear, or for driving either the first power take-off shaft or both power take-off shafts by said change speed gear.

4. A power transmission according to claim 3 wherein said drive means includes a gear fast on said primary shaft and a double gear rotatable on said additional power take-off shaft and having a first gear engaging said gear on said primary shaft, the transmission including a gear rotatable on the first power take-off shaft, and a connecting gearing having a gear engaging the second gear of said double gear and having a gear engaging the gear rotatable on the first power take-off shaft, said clutch means operatively connected to the adjacent ends of said power take-off shafts including a clutch element adapted to either connect said double gear to the additional power take-off shaft or to connect both power take-off shafts, and a clutch element adapted to either connect said gear rotatable on the first power take-off shaft to said first power take-off shaft or to connect both power take-off shafts.

5. A power transmission for motor vehicles comprising a continuous speed changer having a primary shaft and a secondary shaft, a change speed gear including a driven shaft, a main clutch interposed between said secondary shaft and said change speed gear, a first power take-off shaft, a second power take-off shaft placed coaxially of said first power take-off shaft, said power take-off shafts having adjacent ends, disconnectable drive means disconnectably connecting said primary shaft and said second power take-off shaft, a gear fast on said driven shaft, a gear rotatable on said first power take-off shaft and engaging said gear fast on said driven shaft, a clutch element interposed between said first power take-off shaft and said gear rotatable on the latter, a connecting and speed changing gearing operatively connected to said disconnectable drive means and disconnectably connected to said first power take-off shaft, and clutch means interposed between the adjacent ends of said power take-off shafts, whereby said driven shaft can be driven by said primary shaft, upon disengagement of said main clutch and engagement of said clutch element interposed between said first power take-off shaft and said gear rotatable thereon, at a first speed upon connection of said disconnectable drive means, and engagement of said clutch means interposed between the adjacent ends of said power take-off shafts, and at a second speed upon disconnection of said disconnectable drive means, disengagement of said clutch means interposed between the adjacent ends of said power take-off shafts, and connection of said connecting and speed changing gearing to said first power take-off shaft.

References Cited in the file of this patent

UNITED STATES PATENTS

| | | |
|---|---|---|
| 2,140,687 | Brown | Dec. 20, 1938 |
| 2,654,255 | Ferguson et al. | Oct. 6, 1953 |
| 2,661,634 | Bechman et al. | Dec. 8, 1953 |
| 2,881,627 | Hubert et al. | Apr. 14, 1959 |